United States Patent

[11] 3,602,365

| [72] | Inventors | Raymond E. Fisher<br>Reedley, Calif.;<br>Harry C. Eberly, Narvon, Pa. |
|---|---|---|
| [21] | Appl. No. | 866,925 |
| [22] | Filed | Oct. 16, 1969 |
| [45] | Patented | Aug. 31, 1971 |
| [73] | Assignee | Sperry Rand Corporation<br>New Holland, Pa. |

[54] BALE SHAPE ADJUSTING MECHANISM
6 Claims, 5 Drawing Figs.

[52] U.S. Cl. .................................................. 198/223,
100/189
[51] Int. Cl. ..................................................... A01f 15/10
[50] Field of Search .......................................... 198/218,
221, 223, 224; 100/189

[56] References Cited
UNITED STATES PATENTS

| 2,409,478 | 10/1946 | Dickow ...................... | 198/223 X |
| 2,450,082 | 9/1948 | Crumb et al. ................. | 198/223 X |
| 2,471,336 | 5/1949 | Lorenz ......................... | 214/23 |

*Primary Examiner*—Robert G. Sheridan
*Attorneys*—Joseph A. Brown, John C. Thompson, James J. Kennedy and George C. Bower ABSTRACT: Mechanism for adjusting the packer fingers or forks of a pickup baler having a feed unit for delivering crop material to a set of packer fingers which convey material into the bale chamber. Adjustment of the packer fingers is accomplished by a handle or crank located for convenient access by an operator.

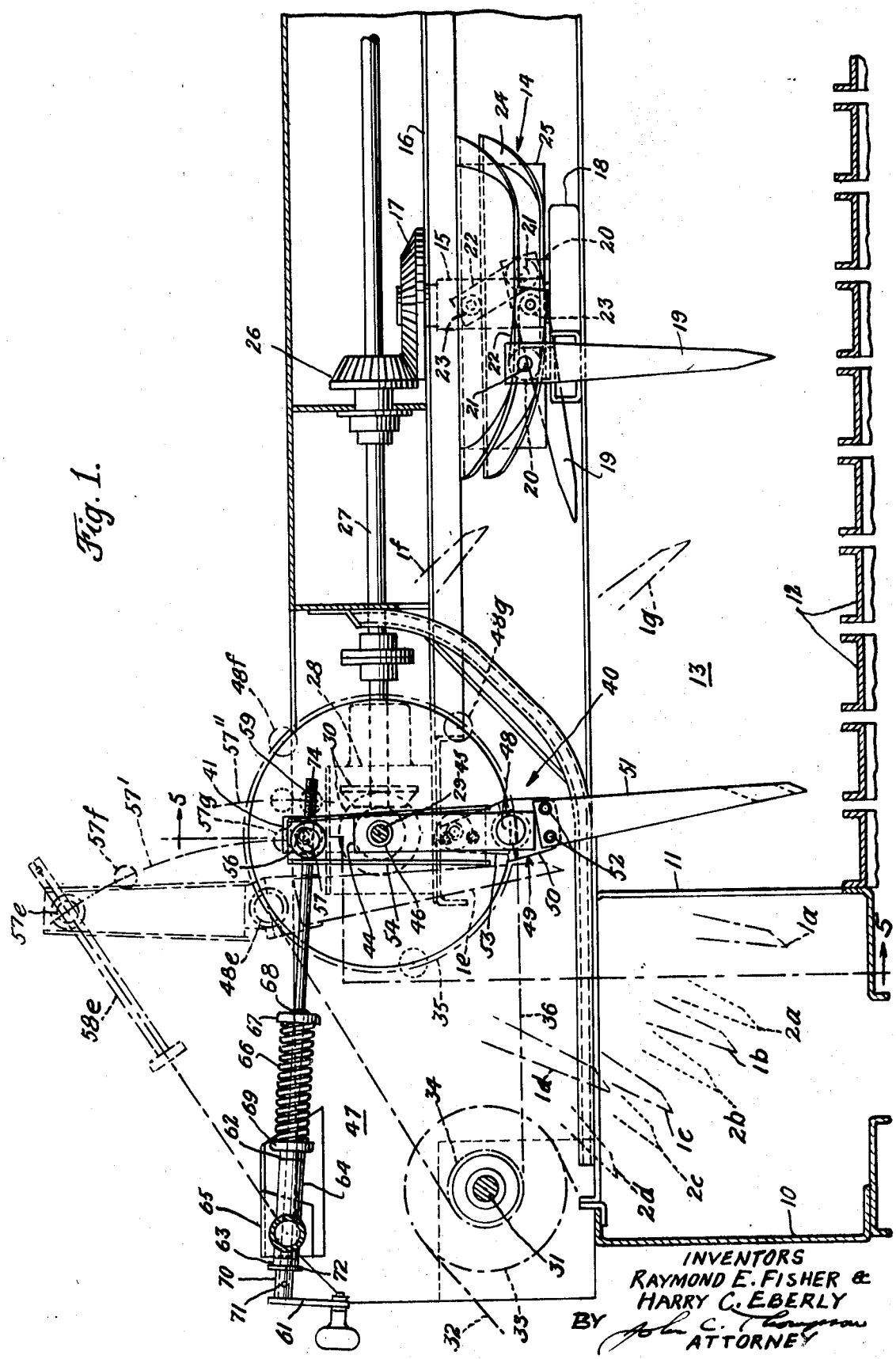

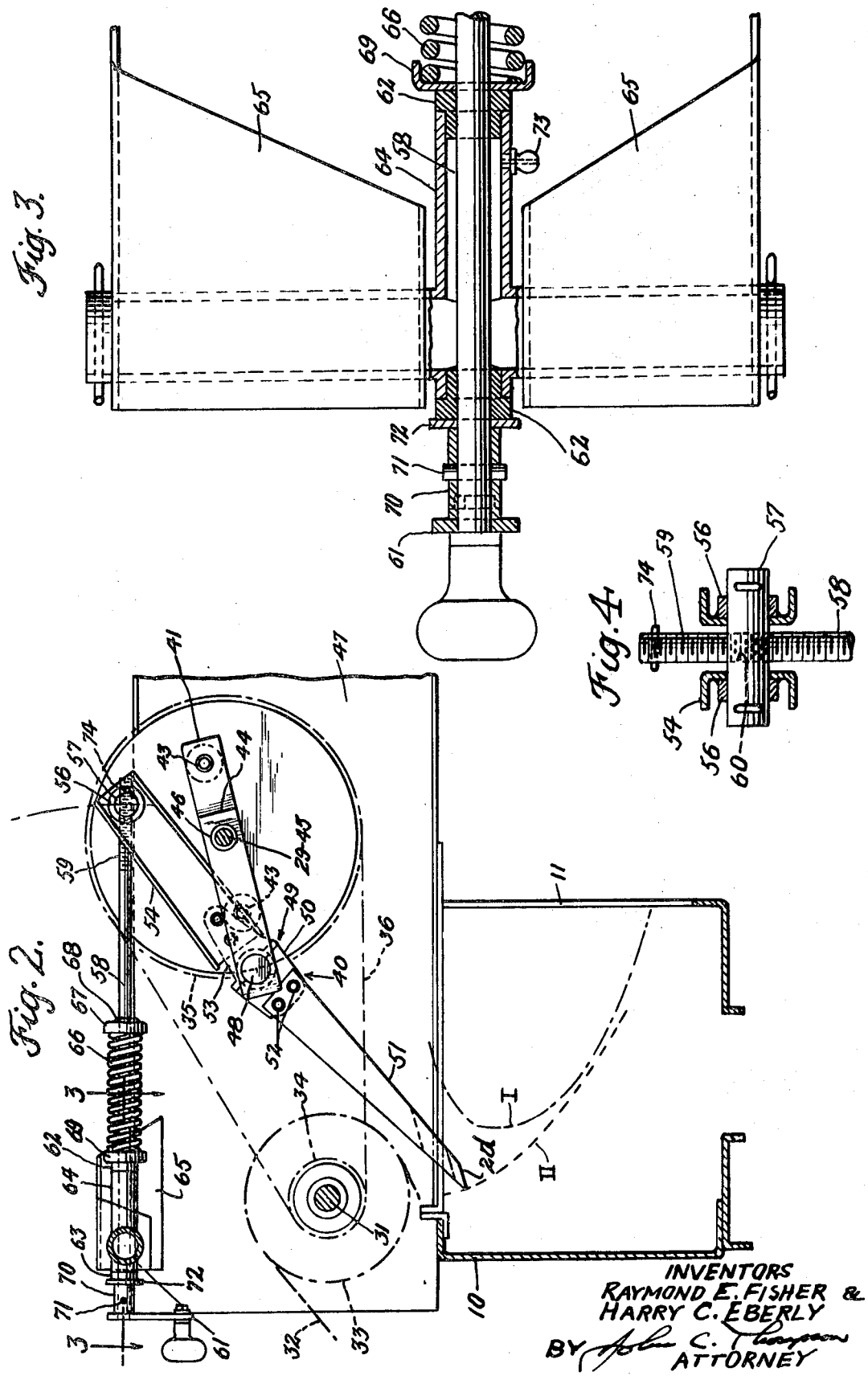

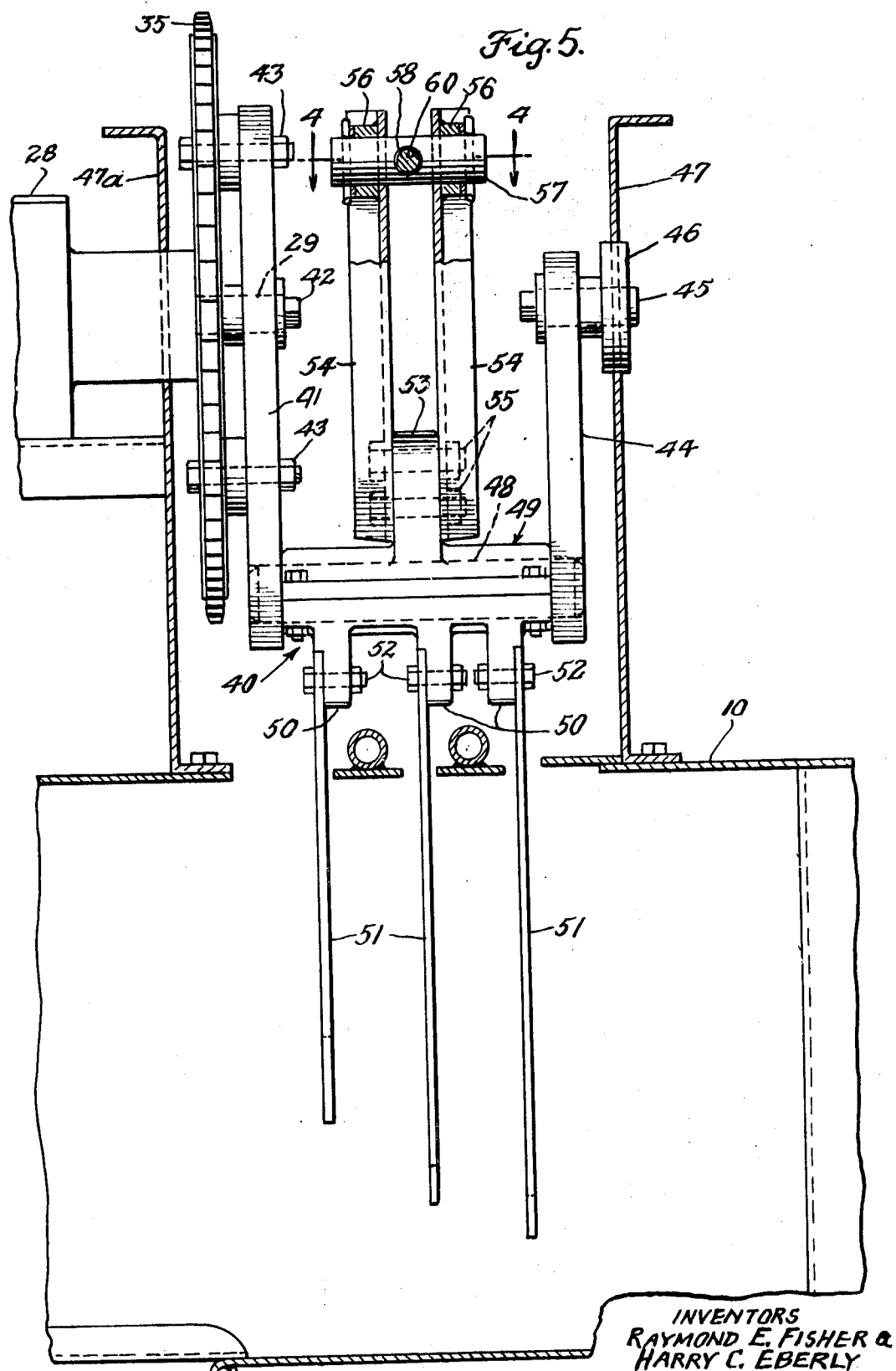

3,602,365

BALE SHAPE ADJUSTING MECHANISM

FIELD OF INVENTION

The present invention relates to agricultural implements and more particularly to crop balers having a feeding mechanism which delivers crop material to a bale chamber where it is formed into bales, the feeding mechanism being assisted by packer fingers or forks.

DESCRIPTION OF PRIOR ART

A typical crop baler includes a bale chamber and plunger for compressing crop material into bales, to which crop material is delivered by known pickup and feeding mechanisms. The present invention is concerned with balers having packer fingers associated with a feeding mechanism. The packer fingers assist the feeding mechanism by insuring that an equal amount of crop material is delivered across the bale chamber. More particularly, the packer fingers properly fill the upper corner of the bale chamber remote from the feeding mechanism. The packer fingers can be adjusted to produce well-shaped bales composed of various kinds of crop material. Heretofore, one method for adjusting such packer fingers of balers comprise bolts carried by the attitude control link and adapted to be adjustably secured in vertically spaced-apart holes on an upwardly extending packer finger arm to alter the packer finger attitude, but this method is objectionable because of the time consumed in stopping the baler and in removing the bolt from one hole and securing it in another hole. Threaded clevises in the attitude control link also have been used for making the adjustments and also are objectionable from the standpoint of loss of time in shutting down the baler to adjust the clevis.

SUMMARY OF THE INVENTION

The packer finger adjusting mechanism of this invention includes a readily accessible adjusting handle or crank operatively connected to the packer fingers to easily and quickly adjust the packer finger attitude so as to control bale shape. The mechanism is capable of operation while the baler is running.

The primary object of the invention resides in the provision, in a baler of the type described, of simple and effective adjusting means for adjusting the attitude of the packer fingers to alter their orbital path and thereby control bale shape.

Another object of the invention resides in the provision of crank operated adjusting means for the packer fingers located for convenient access by an operator.

A further object of the invention resides in the provision of packer finger adjusting mechanism in which finger adjustments can be readily made by an operator with safety while the baler is operating.

Other objects of the invention will be apparent hereinafter from the specification and from the recital in the appended claims.

FIG. 1 is a sectional elevational view of a packer finger adjusting mechanism constructed in accordance with the invention applied to a pickup baler having a rotary type of feeding mechanism;

FIG. 2 is a fragmentary view, similar to FIG. 1, showing the packer finger mechanism adjusted to a different position;

FIG. 3 is an enlarged plan section taken on the line 3—3 of FIG. 2;

FIG. 4 is a fragmentary plan section taken on the line 4—4 of FIG. 5; and

FIG. 5 is an enlarged cross section taken approximately on the irregular line 5—5 of FIG. 1.

DESCRIPTION

Referring to the drawings the baler illustrated comprises a rectangular bale case 10 extending in a fore-and-aft direction relative to the travel of the baler and having a side inlet feed opening 11 through which crop material is fed into the bale case and compressed into a bale in well-known manner by a reciprocating plunger (not shown). A pickup mechanism having stripper members 12 lifts crop material, in well-known manner, from the ground and delivers it into a feeding chamber 13 located above the pickup mechanism.

As seen in FIG. 1 a rotary feed unit, indicated generally at 14, feeds the crop material from the feeding chamber 13 inwardly toward the bale case or chamber 10. The feed unit 14 comprises in general a vertically disposed shaft 15 suitably journaled in a fixed support 16, a driven bevel gear 17 secured on the shaft 15 at its upper end, a bar 18 secured on the shaft 15 at its lower end, and feed fingers 19,19 carried at the ends of the bar 18.

Each feed finger 19 is mounted on the bar 18 for angular movement by means of a bearing block 20 carrying a rockshaft 21 to one end of which the feed finger is fixed. A crank arm 22 is fixed on the other end of the rockshaft and is provided with a cam roller or follower 23 operating in a circular cam track 24 carried by a cylinder 25 fixedly mounted on the support 16.

The bevel gear 17 of the rotary feed unit 14 is driven by a bevel drive pinion 26 secured on the output shaft 27 of a gearbox unit 28 having an input shaft 29 and connecting bevel gears 30,30. Drive is imparted to the input shaft 29 from a power shaft 31 driven from the usual gearbox of the baler (not shown) by a chain 32 and sprocket 33. The power shaft 31 is provided with a second sprocket 34 which is drivingly connected to a larger sprocket 35 secured on the input shaft 29 by a chain 36.

The rotary feed unit 14 delivers the crop material to an orbiting packer finger or fork assembly, generally indicated at 40, which conveys the material into the bale chamber. As best seen in FIG. 5 the assembly 40 comprises a crank arm 41 secured on the shaft 29 as by bolt 42 and to the sprocket 35 by bolts 43,43, a crank arm 44 secured on a stub shaft 45 mounted coaxially with the shaft 29 by means of a bearing 46 carried by the support plate 47, a crank pin 48 connecting the crank arms 41 and 44 and a packer finger carrier 49 mounted on the crank pin 48.

The carrier 49 has three depending lugs 50 to which three packer fingers 51 are secured by bolts 52, and an upstanding lug 53 to which a pair of spaced upwardly extending arms 54,54 are secured by bolts 55. At their free ends the arms 54,54 are provided with bearings 56,56 for a rock pin or trunnion 57.

Adjustment of the attitude of the packer fingers is provided by means of an attitude control link 58 having threads 59 (FIG. 4) at one end threaded into a threaded bore 60 in the trunnion 57 and having an operating handle or crank 61 secured thereto at its other end. At this end portion the attitude rod 58 is rotatably mounted in spaced bearing bushings 62 and 63 of a trunnion member 64 as clearly shown in FIG. 3. The trunnion member 64 is trunnioned in spaced brackets 65,65 secured to the framework sideplates 47 and 47a. A compression spring 66 surrounds the attitude rod 58 and bears at one end against a collar 67 secured to the rod as by means of welds 68 and at its other end against a collar 69 which, in turn, bears against the bearing bushing 62. The shank 70 of the operating handle is secured to the attitude rod as by means of a pin 71 and the shank bears against a washer 72 in turn bearing against the bearing bushing 63. A lube fitting 73 is provided for supplying lubricant to the bearing bushings and attitude rod. The spring 66 reacting from the fixed collar 67 on the rod 58 maintains the bearing bushings under compression in the trunnion member 64 and the lubricant makes for easy turning of the attitude rod when making adjustments.

In the position of adjustment illustrated in FIG. 1 the orbital path of the packer fingers 51 is indicated by the dot and dash positions of the fingers 1a, 1b, 1c, 1d, 1e, 1f, and 1g. It should be noted that when the fingers reach the position 1e, for example, the attitude rod would be in the position 58e shown in dot and dash lines. In moving to this position it will be noted that the crank pin 48 has orbited in a clockwise direction, as viewed in FIG. 1, from the position shown in full lines to the position shown in dot and dash lines at 48e and that the trunnion 57 has traveled upwardly in an arcuate path 57' from the position shown in full lines to the position shown in dot and dash lines at 57e. As the crank pin 48 continues to orbit in a clockwise direction it rotates through positions shown in dot and dash lines at 48f and 48g and finally back to the position shown in full lines, and the trunnion 57 travels downwardly in the arcuate path 57' through positions 57f and 57g and finally back to the position shown in full lines. A portion of the movement of the tip of the longest packer finger adjusted in the manner shown in FIG. 1 is illustrated by the dot-dash line I in FIG. 2.

When the effective length of the attitude rod is lengthened by turning the handle to unscrew the rod from the trunnion 57 to the position shown in FIG. 2 the orbital path of the packer fingers into the bale case would be as indicated by the small dot positions of the fingers 2a, 2b, 2e and 2d. This is also illustrated by the dot-dot line II in FIG. 2. The angular position 2d of the fingers is shown in full lines in FIG. 2. Since the effective length of the attitude rod has been lengthened the arcuate path of the trunnion 57 would be as shown by the dot and dash arcuate line 57'' in FIG. 1.

It will be observed from the foregoing that when the effective length of the attitude rod 58 is shortened, by turning the handle, to the length shown in FIG. 1 the packer finger tips orbit in a path farther away from the left side of the bale case thus reducing the material density on the left side of the bale. When the attitude rod is adjusted to the position shown in FIG. 2, i.e., when its effective length is lengthened the packer fingers penetrate farther toward the left side of the bale case thus increasing the material density on the left side of the bale. Limit of adjustment of the attitude rod or link in the direction of shortening its effective length is determined by the length of the thread 59 of the rod and limit of adjustment in the direction of lengthening its effective length is controlled by a stop pin 74 adjacent the end of the rod.

Through the practice of the invention bale shape adjustment or correction is easily and quickly achieved by the simple rotation of a conveniently located handle or crank adapted to effect attitude control of the packer fingers and thereby alter the orbital path of the packer fingers so as to produce well formed bales composed of various kinds of crop material. An important advantage of the invention is that adjustments can be made with safety while the baler is in operation.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In a baler for crop material having a frame including a bale chamber with a side opening through which crop material is fed into said bale chamber for the formation of a bale, a crop material feeding chamber extending to said side opening of the bale chamber, a feeding unit carried by said frame for feeding crop material in said feeding chamber toward said side opening, and orbiting packer finger means carried by said frame for feeding crop material advanced by said feeding unit into said bale chamber, the combination of means for adjusting the attitude of said packer finger means to alter the orbital path thereof and thereby control bale shape comprising an attitude adjusting link having one end portion pivotally mounted on the frame and another end portion swingably connected to said packer finger means, and an operating handle for changing the effective length of said attitude link between said portions to effect adjustment of the attitude of said packer finger means, said operating handle being located outboard of said feeding chamber whereby it can be operated with safety when the baler is running.

2. A construction in accordance with claim 1 wherein said packer finger means includes packer finger arms provided with a trunnion having a threaded bore therein, and wherein said attitude adjusting link comprises a rod threaded at one end into said trunnion bore, a pivotal mounting for said link adjacent its other end, and an operating handle secured to said link at said other end for rotating said rod to adjust the attitude of said packer fingers.

3. A construction in accordance with claim 1 wherein said packer finger means comprises a rotatable crank, packer fingers carried by said crank having an extension arm, a trunnion mounted in said arm, a transverse threaded bore in said trunnion, and wherein said attitude adjusting link comprises a rotatable rod threaded at one end into the bore of said trunnion, a trunnion adjacent the other end of said rod for pivotally mounting said rod, a fixed support bracket for said latter trunnion, and an operating handle secured to said rod at said other end for rotating the rod to adjust the attitude of the packer fingers.

4. A construction in accordance with claim 1 wherein said packer finger means comprises a rotatable crank and crank pin, a packer finger carrier mounted on said crank pin, depending packer fingers secured to said carrier, and an upwardly extending arm secured to said carrier, a trunnion amounted adjacent the free end of said arm and a threaded transverse bore in said trunnion, and wherein said attitude adjusting link comprises a rod having a screw thread at one end threaded into the bore of said trunnion, a trunnion member carried by said rod adjacent its other end, a fixed bracket for pivotally mounting said trunnion member, spaced bearings for said rod carried by said trunnion member, and an operating handle secured on said rod outboard of said trunnion member and bracket for rotating said rod to make adjustments.

5. A construction in accordance with claim 2 wherein rotation of said rod in one direction decreases its effective length and rotation of said rod in the opposite direction increases its effective length.

6. A construction in accordance with claim 5 and further including means for limiting adjustments of the rod in said directions.